US009619399B2

(12) United States Patent
Agesen

(10) Patent No.: US 9,619,399 B2
(45) Date of Patent: Apr. 11, 2017

(54) LARGE-PAGE OPTIMIZATION IN VIRTUAL MEMORY PAGING SYSTEMS

(75) Inventor: Ole Agesen, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 814 days.

(21) Appl. No.: 13/529,473

(22) Filed: Jun. 21, 2012

(65) Prior Publication Data

US 2012/0265963 A1 Oct. 18, 2012

Related U.S. Application Data

(63) Continuation of application No. 12/014,544, filed on Jan. 15, 2008, now Pat. No. 8,352,705.

(51) Int. Cl.
 G06F 12/02 (2006.01)
 G06F 12/1009 (2016.01)
(52) U.S. Cl.
 CPC .... G06F 12/1009 (2013.01); *G06F 2212/652* (2013.01)
(58) Field of Classification Search
 CPC .................................................. G06F 12/1009
 See application file for complete search history.

(56) References Cited

U.S. PATENT DOCUMENTS

2005/0155020 A1* 7/2005 DeWitt, Jr. ........... G06F 12/126
 717/130
2008/0034234 A1* 2/2008 Shimizu et al. .............. 713/320

* cited by examiner

*Primary Examiner* — Charles Rones
*Assistant Examiner* — Ryan Dare
(74) *Attorney, Agent, or Firm* — Patterson & Sheridan LLP

(57) ABSTRACT

A computer system that is programmed with virtual memory accesses to physical memory employs multi-bit counters associated with its page table entries. When a page walker visits a page table entry, the multi-bit counter associated with that page table entry is incremented by one. The computer operating system uses the counts in the multi-bit counters of different page table entries to determine where large pages can be deployed effectively. In a virtualized computer system having a nested paging system, multi-bit counters associated with both its primary page table entries and its nested page table entries are used. These multi-bit counters are incremented during nested page walks. Subsequently, the guest operating systems and the virtual machine monitors use the counts in the appropriate multi-bit counters to determine where large pages can be deployed effectively.

27 Claims, 12 Drawing Sheets

| PPN 322 | Counter 326 | A 380 | U 382 | X 384 | W 386 | R 388 | D 390 | P 392 | Stop Bit 324 |

LARGE-PAGE OPTIMIZATION IN VIRTUAL MEMORY PAGING SYSTEMS

CROSS-REFERENCE TO RELATED APPLICATIONS

This application is a Continuation of U.S. patent application Ser. No. 12/014,544, filed Jan. 15, 2008.

BACKGROUND OF THE INVENTION

Modern computers employ virtual memory to decouple processes from the physical memory addresses backing the address space of the processes. Using virtual memory enables processes to have a large contiguous address space, and allows the computer to run more processes than can fit simultaneously in their entirety in the available physical memory (i.e., to "over-commit" memory). To do this, virtual memory space is divided into pages of a fixed size, typically 4 kB, 2 MB, or 1 GB, and each page of the virtual memory space either maps onto a page within the physical memory of the same page size or it maps to nothing.

Translation of a virtual memory address to a physical memory address is done by traversing page tables in RAM that contain mapping information. To speed up translation, a TLB (translation lookaside buffer) is typically used. The TLB provides faster translation of virtual addresses to physical addresses than does accessing page tables in RAM because the TLB can provide the beginning-to-end mapping in a single step, and because the TLB can be implemented in a small (and, therefore, fast to access) data structure closer to or in the CPU itself. However, the TLB is limited in size and often a virtual memory page cannot be found in the TLB. Whenever this happens, a "TLB miss" occurs, and the mapping has to be performed by a traversal of the page tables, commonly known as a "page walk," a much slower process than look-ups in the TLB.

Use of large pages reduces the number of TLB misses and generally improves performance of virtual memory systems. However, the use of large pages also generally reduces the ability of an operating system to efficiently utilize the physical memory. Since large pages pose this inherent tradeoff between fast memory access and efficient utilization of physical memory, large pages are not typically used universally. Therefore, it is important to optimize their use and deploy them in places where they will deliver the biggest performance improvement.

SUMMARY OF THE INVENTION

One or more embodiments of the invention provide support for improving virtual memory system performance using large pages. In one embodiment, virtual memory system performance is improved using large pages in a normal (non-virtualized) computer system. In another embodiment, virtual memory system performance is improved using large pages in a virtualized computer system that employs nested page tables. Other names are used for various designs and implementations of essentially the same concept, including extended page tables and rapid virtualization indexing. For brevity, and without loss of generality, the terms nested paging and nested page tables are used herein to refer to all such designs and implementations.

Hardware support according to one or more embodiments of the invention includes a multi-bit counter associated with a page table entry and a hardware page walker that increments the multi-bit counter by one when it visits that page table entry. The computer operating system uses the counts in the multi-bit counters of different page table entries to determine where large pages can be deployed effectively.

A computer system according to another embodiment of the invention has hardware resources including a host processor and a host memory, and is programmed with a virtual machine (VM) having a virtualized processor and a virtualized physical memory that are operatively coupled to the hardware resources under the control of a virtualization software. The computer system further includes a nested paging system that provides a first address translation from the VM's virtual memory address to the VM's physical memory address using primary page tables and a second address translation from the VM's physical memory address to the host physical memory address using nested page tables. In this embodiment, multi-bit counters may be set up for page table entries of a primary page table and for page table entries of a nested page table. When a nested page walker visits a page table entry, the multi-bit counter in that page table entry is incremented by one.

BRIEF DESCRIPTION OF THE DRAWINGS

FIG. 3B is a diagram showing the bits of a page table entry that is configured according to an embodiment of the invention;

DETAILED DESCRIPTION

Figure 1:
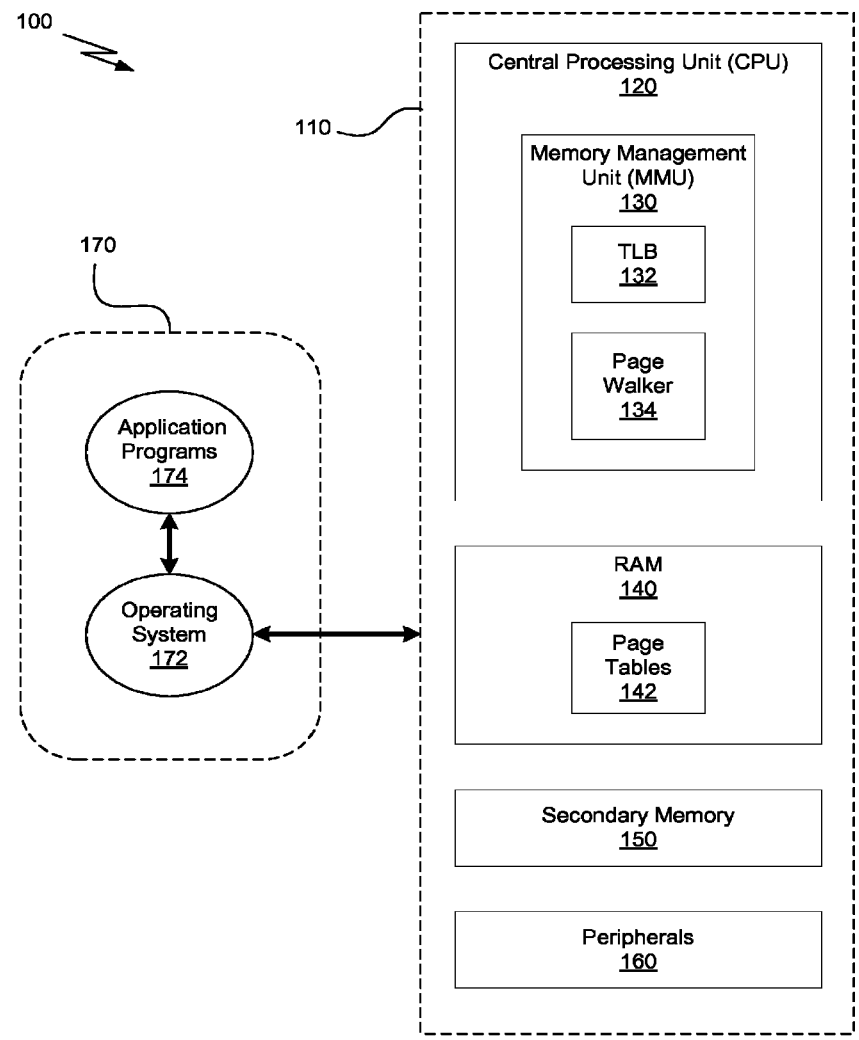
FIG. 1 is a block diagram of various hardware components and software components of a computer system in which one or more aspects of the invention may be implemented.

FIG. 1 is a block diagram of various software components 170 and hardware components 110 of a computer system 100 in which one or more embodiments of the invention may be implemented. The software components 170 include an operating system 172 and one or more application programs 174. The hardware components 110 include a central processing unit (CPU) 120, a random access memory (RAM) 140, a secondary memory 150, and one or more peripherals 160.

The operating system 172 is typically the master control program of the computer system 100. Among other things, the operating system 172 manages the resources of the computer system 100, such as the secondary memory 150, and forms a software platform on top of which the application programs 174 run. The application programs 174 request services of (or through) the operating system 172 via application programming interfaces.

The operating system 172 is responsible for setting up and managing a separate virtual memory for each of the separate processes that are running in the computer system 100. Each of the virtual memory address spaces and the physical memory address spaces are divided into blocks of contiguous memory addresses known as pages, and page tables 142 provide a mapping of the virtual memory pages to the physical memory pages. In one embodiment, page sizes include 4 kB (default page size) and 2 MB (large page size) and page sizes may vary between pages. Each address may be decomposed into a page number, which is the lowest of the addresses in a contiguous block of memory represented by the page, and an offset within that page.

The CPU 120 receives user input from one or more of the peripherals 160, executes programming instructions stored in the RAM 140 and the secondary memory 150, operates on data stored in the RAM 140 and the secondary memory 150, and transmits output to one or more of the peripherals 160. The peripherals 160 include input devices such as keyboard, mouse, or any other device for providing input data to the computer system 100, and output devices such as monitor, printer, or any other device for receiving output data from the computer system 100. The CPU 120 may use the RAM 140 and the secondary memory 150 in any combination for memory operations.

The computer system 100 may be provided with any amount of RAM 140 and any amount of secondary memory 150. The RAM 140 stores data and software such as the operating system 172 and currently running application programs 174. The secondary memory 150 stores data and software, such as additional application programs 174, in the form of read only memory (ROM), floppy disks, hard disks, tape, CD-ROM, etc. Typically, the RAM 140 stores the data and the software that is currently active, whereas the secondary memory 150 stores the data and the software that has been used less recently. The RAM 140 is also referred to herein as "physical memory."

The CPU 120 includes a memory management unit (MMU) 130. The MMU 130 is responsible for handling memory accesses requested by the CPU 120. The MMU 130 has various memory management functions, such as memory protection, cache control, and virtual memory management. The MMU 130 is responsible for translating virtual memory addresses into physical memory addresses. The MMU 130 accomplishes this by using a set of one or more page tables 142 that are provided by the operating system 172 for each of the processes. Each set of page tables 142 provides a map of a particular virtual memory to the physical memory. Typically, the page tables 142 are included in the RAM 140. Each set of page tables 142 is organized as a hierarchical tree having one or more levels. At the highest level in the hierarchical tree is a single page table known as the root of the tree. Each of the page tables 142 includes a set of page table entries, each of which has a pointer to a page in physical memory that contains data ("data page") or to a page table that is at the next-lower level in the page table hierarchy. Consequently, each level in the hierarchical tree includes more page tables than the higher level(s).

The MMU 130 includes a translation lookaside buffer (TLB) 132 and a page walker 134. The TLB 132 is a hardware component that stores mappings of the virtual memory pages to physical memory pages in order to improve the speed of virtual memory accesses. Further, each mapping in the TLB 132 includes additional information to facilitate virtual memory accesses, such as the size of the particular physical memory page. The TLB 132 may be implemented using any technically feasible structure, such as an associative array or hash table. The page walker 134 is a hardware component that is configured to run a sequence of steps, known as a "page walk," that use the page tables 142 to determine a mapping of a virtual memory address to a physical memory address. The page walker 134 is further configured to insert this mapping as an entry in the TLB 132.

It should be understood that the computer system 100 illustrates selected elements of a general purpose computer system, and is not intended to illustrate a specific architecture. For example, no particular bus structure is shown because different known bus structures can be used to interconnect the hardware components 110 in a number of ways, as desired. Further, as shown in FIG. 1, the MMU 130 is integrated into the CPU 120, but the MMU 130 can be provided as a discrete component. Similarly, the CPU 120 and the RAM 140 can be integrated into a single component. Moreover, the number and arrangement of the elements of the computer system 100 can be varied from what is shown and described in ways known in the art.

Figure 2:
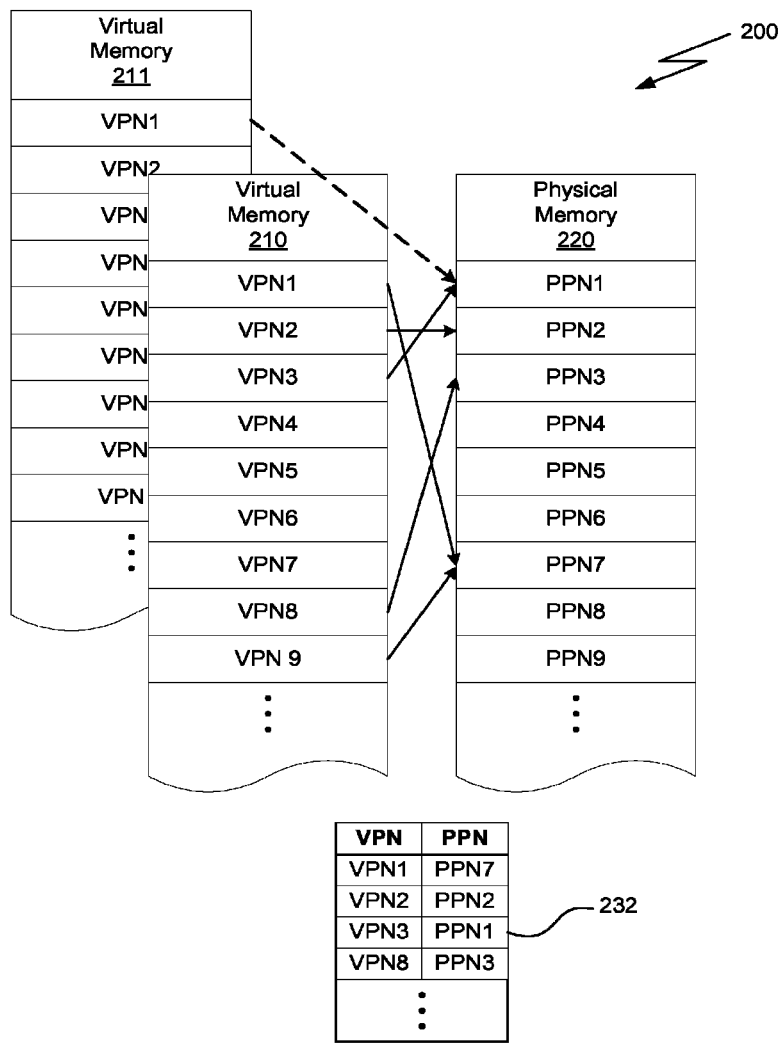
FIG. 2 is a conceptual diagram showing an exemplary virtual to physical memory mapping in the computer system of FIG. 1.

FIG. 2 is a conceptual diagram showing an exemplary virtual to physical memory mapping 200 in the computer system 100 of FIG. 1. Each of the mappings shown in the virtual to physical memory mapping 200 may be determined by executing a page walk using the page walker 134 and a set of the page tables 142.

As shown, a virtual memory 210 (also known as "address space") corresponding to a particular process is represented by a column of virtual page numbers (VPNs), and a virtual memory 211 corresponding to a different process is represented by a separate column of VPNs. A physical memory 220 corresponding to the RAM 140 is represented by a column of physical page numbers (PPNs). Different virtual memories are typically set up for each of the different processes that are launched in the computer system 100, consequently there may be any number of virtual memories, such as the virtual memory 210 and the virtual memory 211. However, there is only one physical memory 220. Each row of a TLB 232 includes a VPN and the corresponding PPN.

Solid arrows in FIG. 2 illustrate the mapping of various pages of the virtual memory 210 to various pages of the physical memory 220. Multiple VPNs within the same virtual memory (i.e., address space or process) may map to the same PPN—a functionality known as intra-process sharing. For example, VPN1 and VPN9 of the virtual memory 210 both map to PPN7 of the physical memory 220. A dotted arrow in FIG. 2 illustrates an exemplary mapping of one page of the virtual memory 211 to one page of the physical memory 220. Multiple VPNs from different virtual memories (i.e., address spaces or processes) may map to the same PPN—a functionality known as inter-process sharing. For example, VPN3 of the virtual memory 210 and VPN1 of the virtual memory 211 both map to PPN1 of the physical memory 220.

Figure 3A:
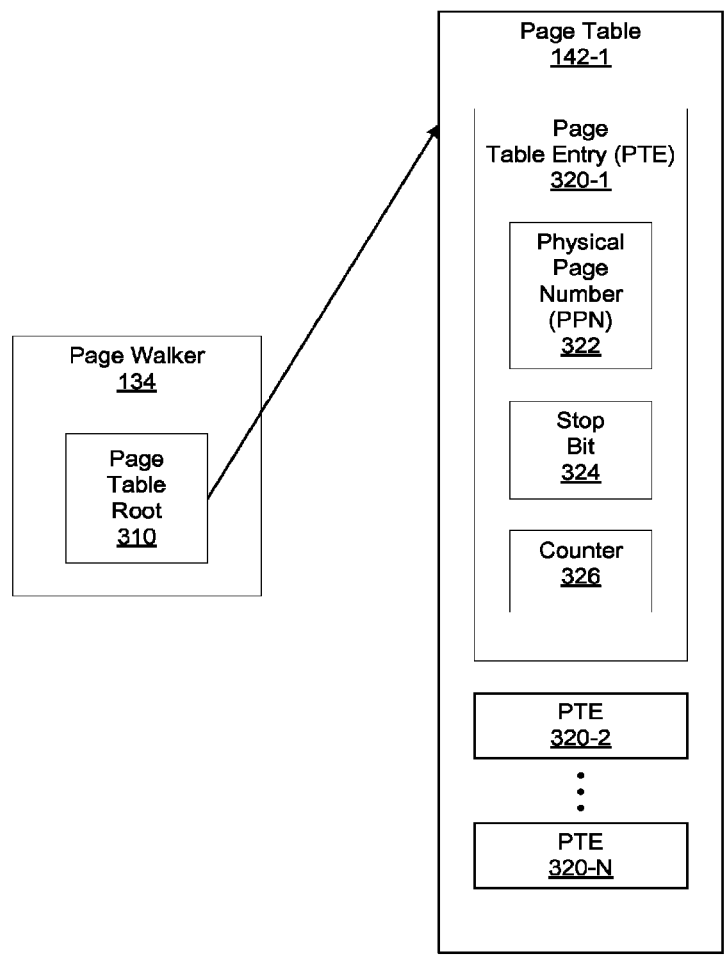
FIG. 3A is a more detailed conceptual diagram of a page walker and a page table of the computer system of FIG. 1.

FIG. 3A is a more detailed conceptual diagram of a page walker 134 and a page table 142-1 of the computer system 100 of FIG. 1. The page walker 134 includes a page table root 310, which points to the highest level page table in the page table hierarchy. The page table 142-1 includes one or more page table entries (PTEs) (e.g., PTE 320-1, PTE 320-2, . . . , PTE 320-N, collectively referred to as "PTEs 320"). Further, as shown in FIG. 3B, a page table entry (e.g., PTE 320-1) includes multiple bits for a physical page number (PPN) 322, multiple bits for a counter 326, a page accessed bit (A) 380, a user permission bit (U) 382, an execute permission bit (X) 384, a write permission (W) bit 386, a read permission (R) bit 388, a page dirty bit (D) 390, a page present bit (P) 392, and a stop bit 324. The A, U, X, W, R, D, P, and stop bits are employed as they are in conventional PTEs. It should be understood that FIG. 3B illustrates one possible configuration of bits in a page table entry, and that the number and arrangement of the elements in a page table entry can be varied from what is shown.

The PPN 322 indicates the next page in the page table hierarchy. If a particular PTE is at the lowest level of the page table hierarchy, then the PPN 322 points to a data page. If a particular PTE is not at the lowest level of the page table hierarchy, then the PPN 322 points to a lower-level page table 142.

The stop bit 324 is set to one to indicate that the corresponding PTE is the lowest level of the page table hierarchy. Since the size of the data pages may vary within the physical memory 220, the stop bit 324 may be set to one in PTEs at various levels in the page table hierarchy. In this fashion, the page walk may be short-circuited so that one or more levels in the page table hierarchy are not traversed when mapping a large data page that is not in the TLB 132. At level one in the page tree hierarchy (the lowest level that the page table hierarchy supports), the stop bit 324 is ignored. In alternative embodiments, the stop bit 324 does not exist in PTEs that are at level one in the page table hierarchy. An alternative name for the stop bit, accordingly, is the L bit, where L stands for large page.

In one or more embodiments of the invention, two or more unused bits of a conventional PTE are allocated as bits for the counter 326. The counter 326 monitors the activity of the corresponding PTE. For each of the PTEs 320, the page walker 134 is configured to increment the corresponding counter 326 every time the PTE is accessed. In this fashion, the counter 326 records the number of times that its associated PTE is accessed during the page walks. In some embodiments, the bits of the counter 326 may subsume the A bit.

In alternative embodiments, the counter 326 is not included in PTEs 320 of page tables at every level of the page table hierarchy. Further, in some embodiments, during periods when information from the counter 326 is not used, the operating system 172 saturates the counter 326, thereby bypassing the counter incrementing step. In other embodiments, the page walker 134 is configured to generate an interrupt whenever the counter 326 in a PTE saturates. The interrupt may spawn a variety of activity, such as a targeted drain of the saturated counter (e.g., recording that the saturation occurred and, subsequently, resetting the saturated counter) or a streamlined search for pages to map larger. In other embodiments, the counters 326 are not included in any of the PTEs 320. Instead, the counters 326 are included in a completely different data structure that the page walker 134 maintains in parallel to the page tables 142. The page walker 134 increments the counters 326 in the parallel data structure during page walks.

Figure 4:
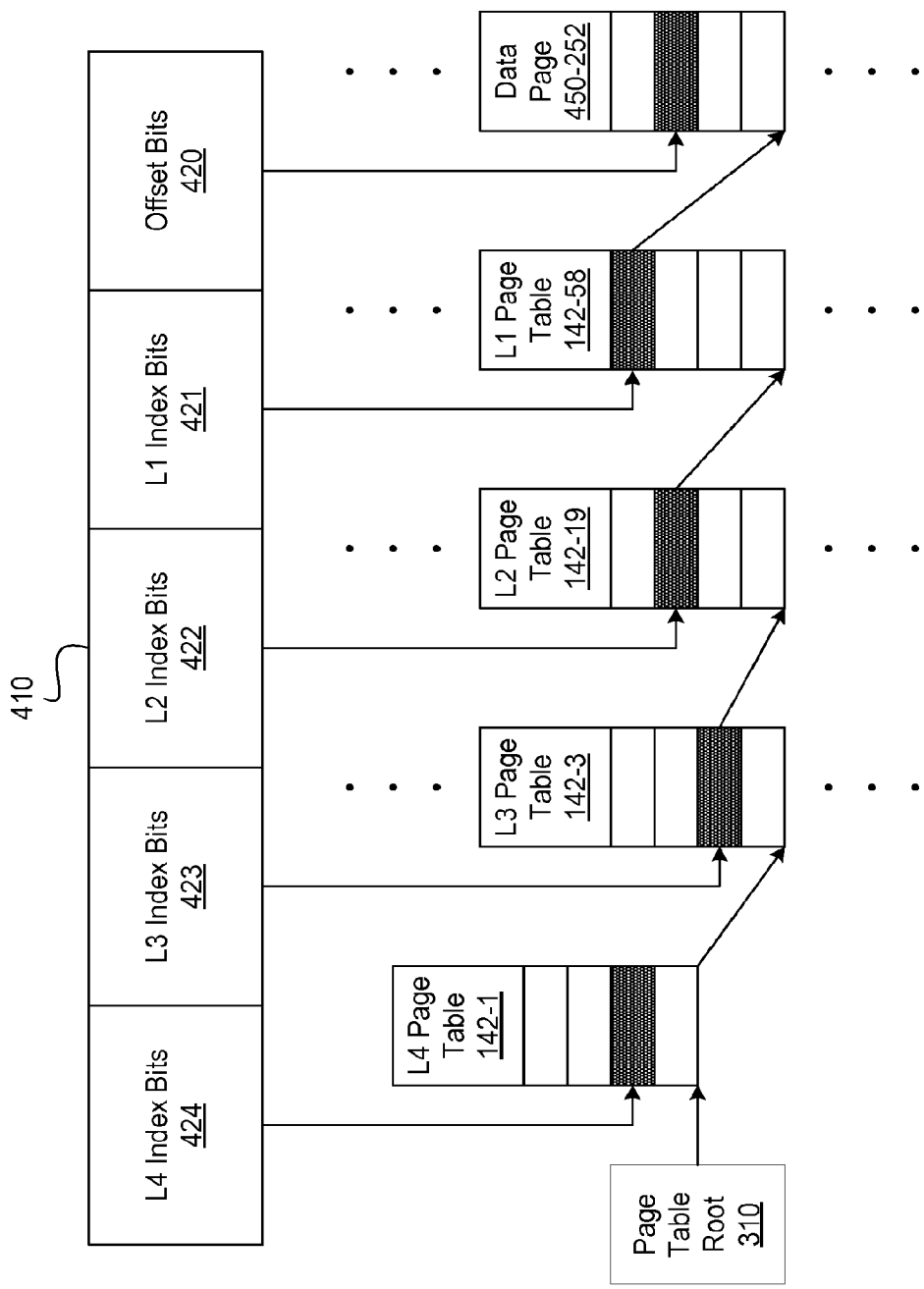
FIG. 4 is a conceptual diagram showing an exemplary page walk using a page walker and page tables of the computer system of FIG. 1.

FIG. 4 is a conceptual diagram showing an exemplary page walk using a page walker 134 and page tables 142 of the computer system 100 of FIG. 1. The page walk is triggered when a virtual address (VA) 410 that is not in the TLB 132 is accessed and begins at the page table root 310. In this embodiment, the set of page tables 142 includes four hierarchical levels.

As shown, the virtual address 410 is subdivided into five fields: level four index bits 424, level three index bits 423, level two index bits 422, level one index bits 421, and offset bits 420. Depending on the size of the virtual address, the virtual address 410 may include additional bits that are not used during the mapping of virtual memory addresses to physical memory addresses. Each of the index bits 421, 422, 423, 424 and the offset bits 420 may include any number of bits as appropriate for the computer system 100. In alternative embodiments, the bits in the virtual address 410 may be subdivided into more or fewer fields. Typically, the subdivision of the virtual address 410 reflects the number of levels supported by the page walker 134, the size of the smallest available physical pages, the size of the virtual memory address space, and the size of the physical memory address space.

In this embodiment, the page walker 134 uses the page table root 310 to determine that the level four page table is the page table 142-1. The page walker 134 then uses the level four index bits 424 to index into the page table 142-1, thereby obtaining a level four PTE. The page walker 134 uses the PPN stored in this level four PTE to determine that the level three page table is the page table 142-3. The page walker 134 uses the level three index bits 423 to index into the page table 142-3, thereby obtaining a level three PTE. The page walker 134 uses the PPN stored in this level three PTE to determine that the level two page table is the page table 142-19. The page walker 134 uses the level two index bits 422 to index into the page table 142-19, thereby obtaining a level two PTE. The page walker 134 uses the PPN stored in this level two PTE to determine that the level one page table is the page table 142-58. The page walker 134 uses the level one index bits 421 to index into the page table 142-58, thereby obtaining a level one PTE. The page walker 134 uses the PPN stored in this level one PTE to access the data page 450-252. Subsequently, the page walker 134 uses the offset bits 420 to index into the data page 450-252, thereby accessing the data corresponding to the virtual address 410. In addition, the page walker 134 enters the pair consisting of the virtual page number corresponding to the index bits 421, 422, 423, 424 and the physical page number corresponding to the data page 450-252 into the TLB 132.

If the stop bit 324 is set to one in a PTE that is accessed at a higher level in the page table hierarchy, then the page walker 134 uses the PPN 322 in the corresponding PTE to access a large data page. The page walker 134 then indexes into the large data page using a composition of the remaining index bits of the virtual address 410 and the offset bits 420, thereby accessing the data corresponding to the virtual address 410. In addition, the page walker 134 enters the large page mapping into the TLB 132.

Figure 5:
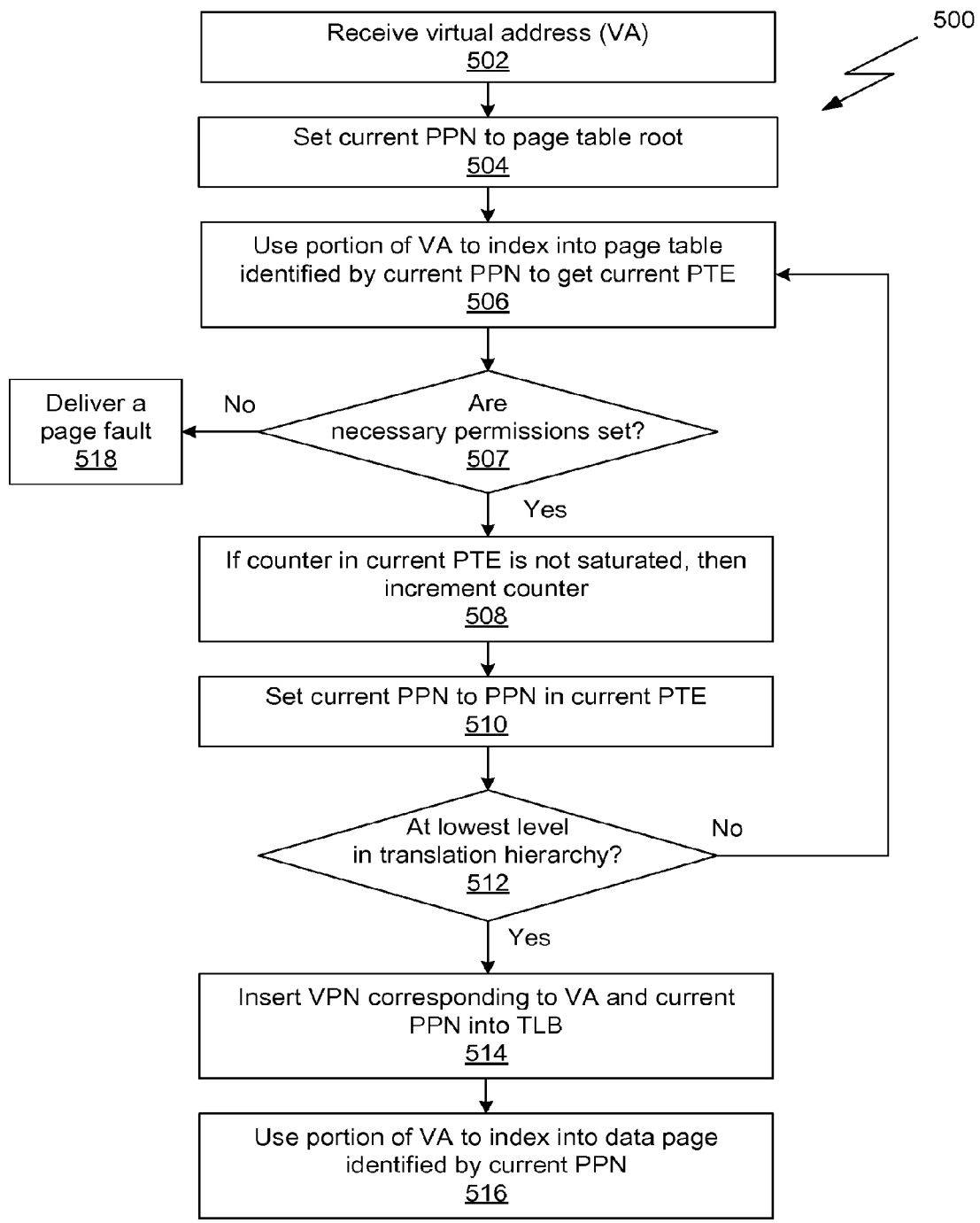
FIG. 5 is a flow diagram of method steps for mapping a virtual address to a physical address in accordance with an embodiment of the invention.

FIG. 5 is a flow diagram of method steps for mapping a virtual address to a physical address in accordance with an embodiment of the invention. Although the method steps are described in conjunction with the computer system 100 of FIG. 1, persons skilled in the art will understand that any system that performs the method steps is within the scope of the invention.

As shown, the method 500 begins at step 502, where the page walker 134 receives a virtual address. At step 504, the page walker 134 sets the current physical page number to the page table root 310. At step 506, the page walker 134 uses a portion of the virtual address to index into the page table 142 that is identified by the current physical page number, thereby accessing a current page table entry. At step 507, the page walker 134 evaluates access properties (e.g., whether the access is for read, write, or execution purposes) in conjunction with additional bits in the current page table entry (e.g., the write permission (W) bit 386 and the page present bit (P) 392) to determine if the requested access is permissible. If the page walker 134 determines that the requested access is not permissible, then the page walker 134 proceeds to step 518. At step 518, the page walker 134 delivers a page fault, and the method 500 terminates. If, at step 507, the page walker 134 determines that the requested access is permissible, then the page walker 134 proceeds to step 508. At step 508, if the counter 326 in the current page table entry is not saturated, then the page walker 134 increments the counter 326 by one. If the counter 326 is saturated, then step 508 is skipped. At step 510, the page walker 134 sets the current physical page number to the physical page number 322 in the current page table entry.

At step 512, if the stop bit 324 in the current page table entry is not set to one, then the method 500 returns to step 506. The method continues in this fashion, looping through steps 506, 507, 508, 510 and 512, until the page walker 134 traverses through the page tables 142 to the lowest level in the page table hierarchy, i.e., encounters a page table entry with a stop bit 324 set to one or reaches level one in the page table hierarchy. If, at step 512, the current page table entry is at the lowest level in the page table hierarchy, then the method 500 proceeds to step 514. At step 514, the page walker 134 inserts the pair consisting of the virtual page number corresponding to the virtual address and the current physical page number into the TLB 132. As part of step 514, the page walker 134 may clear an appropriate number of low-order bits in the virtual page number and the current physical page number before inserting the pair into the TLB 132. For example, if the page walker 134 stopped traversing the page tables 142 at level one, then the page walker 134 does not clear any bits. However, if the page walker 134 stopped traversing the page tables 142 at a higher level in the page table hierarchy, then the page walker 134 clears one or more bits as determined by the large page's size. At step 516, the page walker 134 uses a portion of the virtual address to index into the data page that is identified by the current physical page number, and accesses the data at the physical address corresponding to the virtual address.

Using the counters 326 in the PTEs 320 in this fashion, the page walker 134 tracks the activity throughout the page tables 142 during the page walks that are initiated after TLB misses. Further, the existence of this activity tracking data enables the operating system 172 to define a policy for deploying large pages using any technically feasible method.

In one embodiment, the operating system 172 first clears all of the counters 326 to zero. Then, the operating system 172 allows the counters 326 to accumulate as various application programs 174 run on the computer system 100. After a specified length of time, a profiling program searches through the page tables 142 starting from the page table root 310. At the page table root 310 the profiling program identifies one or more PTEs 320 that include counters 326 set to a high count, thus indicating a high number of accesses during the page walks. The profiling program then follows the corresponding PPN 322 in the identified high-activity PTEs to the next-lower hierarchical level. The profiling program continues to identify high-activity PTEs and traverses to the child PTEs until the profiling program has identified a set of high-activity PTEs at level two in the page table hierarchy. If any of the level two PTEs has a counter value that exceeds a threshold value, then the operating system 172 may select one or more of the level two PTEs to be mapped to a large page. For each of the selected level two PTEs, the operating system 172 allocates a 2 MB large page in the following manner. First, the operating system 172 copies the data from the collection of small pages accessed through the selected level two PTE to the newly allocated 2 MB large page. If any of the small pages had been swapped out or not allocated until now, the operating system 172 may swap-in or pre-zero missing pieces. The operating system 172 then sets the stop bit 324 in the selected level two PTE to one, thereby indicating that the selected level two PTE is now the lowest level in the page table hierarchy when mapping this 2 MB range of virtual addresses. Finally, the operating system 172 sets the PPN 322 in the selected level two PTE to point to the newly allocated 2 MB large page. A wide variety of other techniques may be used to define and execute a policy for large page table mapping.

In another embodiment, the page walker 134 is configured to generate an interrupt whenever one of the counters 326 saturates. In such an embodiment, an interrupt triggers the operating system 172 to either perform a targeted drain of the saturated counter or guides the profiling program to search for high-activity PTEs starting from the PTE that generated the interrupt. In other embodiments, the page walker 134 may be configured to only increment the counters 326 during selected page walks, thereby sampling a subset of the page walks. For example, the profiling program might specify a numerical parameter that indicates which fraction of the page walks to sample (e.g., one out of one hundred). Subsequently, the page walker 134 might be configured to pseudo-randomly select page walks during which to increment the counters 326 such that overall the counters 326 are incremented during one percent of the page walks.

Figure 6:
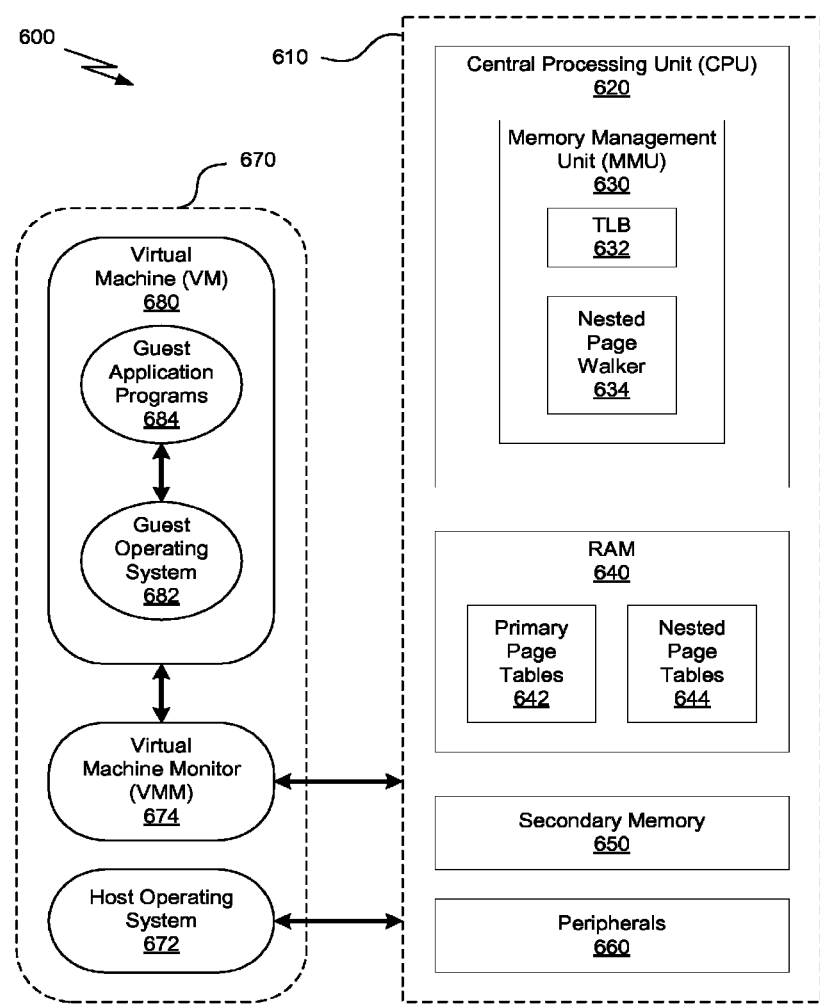
FIG. 6 is a block diagram of various hardware components and software components of another computer system in which one or more aspects of the invention may be implemented.

FIG. 6 is a block diagram of various hardware components 610 and software components 670 of a computer system 600 in which one or more embodiments of the invention may be implemented. The software components 670 include a host operating system 672, one or more virtual machine monitors (VMM) 674, and one or more virtual machines 680. The hardware components 610 include a central processing unit (CPU) 620, a random access memory (RAM) 640, a secondary memory 650, and one or more peripherals 660.

The virtual machine monitor 674 is a software interface layer on top of which one or more virtual machines 680 run. The virtual machine monitor 674 may run on top of the host operating system 672 or directly on the hardware components 610. Together, the virtual machine monitor 674 and the virtual machine 680 create a virtualized computer system that gives the appearance of being distinct from the computer system 600. The virtual machine 680 includes a guest operating system 682 and one or more guest application programs 684. The guest operating system 682 is the master control program of the virtualized computer system and, among other things, the guest operating system 682 forms a software platform on top of which the guest application programs 684 run. Whenever any of the guest application programs 684 starts, a new guest process is created. Further, each of the guest application programs 684 may be started multiple times, resulting in multiple guest processes.

Many of the hardware components 610 of the computer system 600 are interchangeable with the hardware components 110 of the computer system 100. Further, the basic functionality of each of the hardware components 610 is similar to the functionality of the corresponding hardware component 110.

The guest operating system 682 is responsible for setting up and managing a separate virtual memory for each of the separate guest processes that are running in the virtual machine 680. The VMM 674 is responsible for setting up and managing a separate physical memory that emulates the virtual RAM in the virtualized computer system represented by each separate virtual machine 680. The memory directly corresponding to the RAM 640 is referred to herein as "machine memory." For each process, the guest operating system 682 defines a set of primary page tables 642 that map virtual addresses to physical addresses of the virtual RAM. Similarly, for each virtual machine 680, the VMM 674 defines a set of nested page tables 644 that map physical addresses of the virtual RAM (also referred to herein as "virtualized physical memory addresses") to machine addresses (also referred to herein as "host physical memory addresses"). As shown, typically, both the primary page tables 642 and the nested page tables 644 are stored in the RAM 640. However, if a particular page table is inactive, then the page table may be stored in secondary memory 650.

Each set of primary page tables 642 is organized as a hierarchical tree having one or more levels. The highest level in the hierarchical tree for a given process is a single primary page table, known as the root of the tree. Each of the primary page tables 642 includes a set of page table entries, each of which has a pointer to a data page or a primary page table at the next-lower level in the hierarchy. Consequently, each level in the hierarchical tree includes more primary page tables 642 than the higher level(s).

Similarly, each set of nested page tables 644 is organized as a hierarchical tree having one or more levels. The highest level in the hierarchical tree for a given virtual machine is a single nested page table, known as the root of the tree. Each of the nested page tables 644 includes a set of page table entries, each of which points to a data page or a nested page table at the next-lower level in the hierarchy. Consequently, each level in the hierarchical tree includes more nested page tables 644 than the higher level(s).

MMU 630 is responsible for handling memory accesses requested by the CPU 620 and carries out the virtual memory translation function. To accomplish this function, the MMU 630 includes a translation lookaside buffer (TLB) 632 and a nested page walker 634. The TLB 632 is a hardware component that stores mappings of virtual memory pages to machine memory pages in order to improve the speed of virtual memory accesses. Each mapping in the TLB 632 includes additional information to facilitate virtual memory accesses, such as the size of the particular machine memory page. The TLB 632 may be implemented using any technically feasible structure, such as an associative array or hash table. The nested page walker 634 is a hardware component that is configured to run a sequence of steps, known as a "nested page walk," that use the primary page tables 642 and the nested page tables 644 to determine a mapping of the virtual memory to the machine memory. The nested page walker 634 is further configured to insert this mapping as an entry in the TLB 632.

It should be understood that the computer system 600 illustrates selected elements of a general purpose computer system, and is not intended to illustrate a specific architecture. Further, as shown in FIG. 6, the MMU 630 is integrated into the CPU 620, but the MMU 630 can be provided as a discrete component. Similarly, the CPU 620 and the RAM 640 can be integrated into a single component. Moreover, the number and arrangement of the elements of the computer system 600 can be varied from what is shown and described in ways known in the art.

Figure 7:
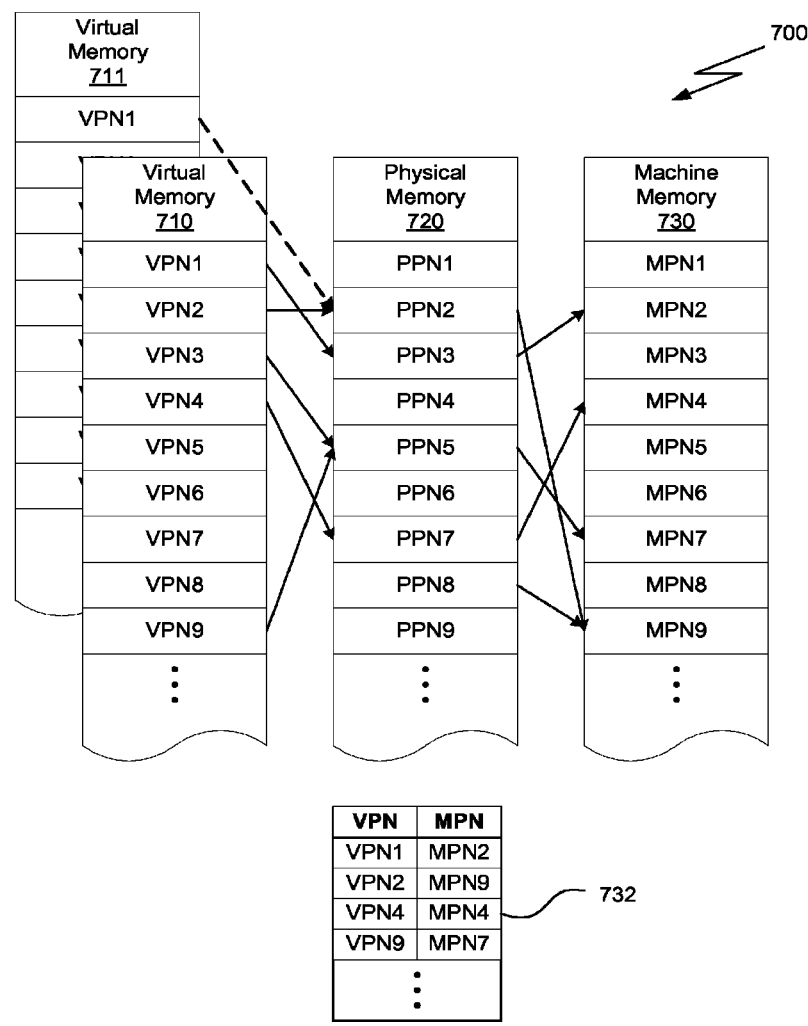
FIG. 7 is a conceptual diagram showing an exemplary virtual to machine memory mapping in the computer system of FIG. 6.

FIG. 7 is a conceptual diagram showing an exemplary virtual to machine memory mapping 700 in the computer system 600 of FIG. 6. Each of the mappings shown in the virtual to machine memory mapping 700 may be determined by executing a nested page walk using the nested page walker 634, a set of the primary page tables 642, and a set of the nested page tables 644.

As shown, a virtual memory 710 (also known as "address space") corresponding to a particular guest process is represented by a column of virtual page numbers (VPNs), and a virtual memory 711 corresponding to a different guest process is represented by a separate column of VPNs. A physical memory 720 corresponding to a particular virtual machine 680 is represented by a column of physical page numbers (PPNs). Lastly, a machine memory 730 corresponding to the RAM 640 is represented by a column of machine page numbers (MPNs). Different virtual memories are typically set up for each of the different guest processes that are launched in the virtual machine 680, and consequently there may be any number of virtual memories, such as the virtual memory 710 and the virtual memory 711, associated with each virtual machine 680. Similarly, different physical memories are typically set up for each of the different virtual machines 680 that are running in the computer system 600. Although there may be any number of virtual machines 680 and, therefore, physical memories, FIG. 7 depicts the physical memory 720 for only one such virtual machine.

Solid arrows in FIG. 7 illustrate the mapping of various pages of the virtual memory 710 to various pages of the physical memory 720, and the mapping of various pages of the physical memory 720 to the machine memory 730. Multiple VPNs within the same virtual memory (i.e., address space or process) may map to the same PPN—a functionality known as intra-process sharing. For example, VPN3 and VPN9 of the virtual memory 710 both map to PPN5 of the physical memory 720. Similarly, multiple PPNs within the same physical memory may map to the same MPN—a functionality known as intra-VM sharing. For example, PPN2 and PPN8 of the physical memory 720 both map to MPN9 of the machine memory 730.

Each composite mapping from a specified VPN to a MPN includes a mapping from the specified VPN to an intermediate PPN, and a subsequent mapping from the intermediate PPN to the corresponding MPN. Each row in an exemplary TLB 732 includes a VPN and the corresponding MPN that is a composition of two of the illustrated mappings. The TLB 732 does not include any physical page numbers.

A dotted arrow in FIG. 7 illustrates an exemplary mapping of one page of the virtual memory 711 to one page of the physical memory 720. Multiple VPNs from different virtual memories (i.e., address spaces or processes) may map to the same PPN—a functionality known as inter-process sharing. For example, VPN2 of the virtual memory 710 and VPN1 of the virtual memory 711 both map to PPN2 of the physical memory 720. Similarly, although not shown in FIG. 7, multiple PPNs from different physical memories (i.e., virtual machines 680) may map to the same MPN—a functionality known as inter-VM sharing.

Figure 8:
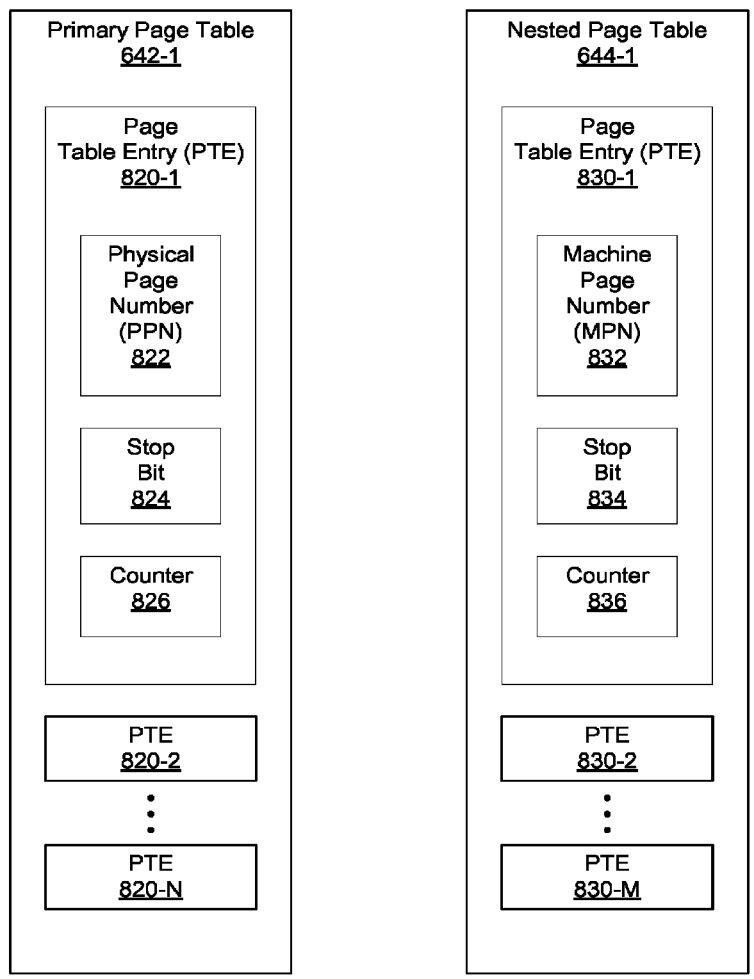
FIG. 8 is a more detailed conceptual diagram of a primary page table and a nested page table of the computer system of FIG. 6.

FIG. 8 is a more detailed conceptual diagram of a primary page table and a nested page table of the computer system 600 of FIG. 6. As shown in detail for the primary page table 642-1, each primary page table includes one or more page table entries (PTEs) (e.g., PTE 820-1, PTE 820-2, . . . , PTE 820-N, collectively referred to as "PTEs 820"). Further, each of the PTEs 820 (e.g., PTE 820-1) includes a physical page number (PPN) 822, a stop bit 824, and a counter 826. The PPN 822 indicates the next page in the primary page table hierarchy. If a particular PTE is at the lowest level of the primary page table hierarchy, then the PPN points to a data page. If a particular PTE is not at the lowest level of the primary page table hierarchy, then the PPN points to a lower level primary page table.

The stop bit 824 is set to one to indicate that the corresponding PTE is the lowest level of the primary page table hierarchy. Since the size of the data pages may vary within the physical memory 720, the stop bit 824 may be set to one in PTEs 820 at various levels in the primary page table hierarchy. In this fashion, the nested page walk may be short-circuited so that one or more levels in the hierarchy of the primary page tables 642 are not traversed when addressing a data page that is mapped large within the physical memory 720. At level one in the primary page table hierarchy (the lowest level that the primary page table hierarchy supports), the stop bit 824 is ignored. In alternative embodiments, the stop bit 824 may not exist in PTEs 820 that are at level one in the primary page table hierarchy.

Since the physical memory 720 is an abstraction of the machine memory 730, the PPNs 822 do not directly specify pages in the RAM 640. To access information corresponding to a particular PPN, the PPN is converted to a corresponding machine page number. As discussed above, mappings of the physical pages to the machine pages are performed by a page walk using the nested page tables 644. Thus, to traverse from a particular PTE to a lower level primary page table, the PPN 822 of the PTE needs to be converted to a corresponding MPN by performing a page walk using the nested page tables 644.

Each counter 826 includes two or more bits that are used to monitor the activity of its corresponding PTE. For each of the PTE 820s, the nested page walker 634 is configured to increment the corresponding counter 826 each time the PTE is accessed. In this fashion, the counter 826 records the number of times that its associated PTE is accessed during nested page walks.

In alternative embodiments, the counter 826 is not included in the PTEs 820 of primary page tables 642 at every level of the primary page table hierarchy. Further, in some embodiments, the guest operating system 682 saturates the counter 826 in one or more of the PTEs 820, thereby bypassing the counter incrementing step. In other embodiments, the nested page walker 634 may be configured to generate an interrupt whenever the counter 826 in a PTE saturates. In some embodiments, the counters 826 are not included in any of the PTEs 820. Instead, the counters 826 are included in a completely different data structure that the nested page walker 634 maintains in parallel to the primary page tables 642. The nested page walker 634 increments the counters 826 in the parallel data structure during nested page walks. In other embodiments, the nested page walker 634 may be configured to sample the usage of the primary page tables 642 during nested page walks by only incrementing the counters 826 within the PTEs 820 of the primary page tables 642 during selected nested page walks.

As shown in detail for the nested page table 644-1, each nested page table 644 includes one or more page table entries (PTEs) (e.g., PTE 830-1, PTE 830-2, . . . , PTE 830-N, collectively referred to as "PTEs 830"). Further, each of the PTEs 830 (e.g., PTE 830-1) includes a machine page number (MPN) 832, a stop bit 834, and a counter 836. The MPN 832 indicates the next page in the nested page table hierarchy. If a particular PTE is at the lowest level of the nested page table hierarchy, then the MPN 832 points to a data page. If a particular PTE is not at the lowest level of the nested page table hierarchy, then the MPN 832 points to a lower-level nested page table 644.

The stop bit 834 is set to one to indicate that the corresponding PTE is the lowest level of the nested page table hierarchy and, consequently, the MPN 832 corresponds to a data page. Since the size of the data pages may vary within the machine memory 730, the stop bit 834 may be set to one in PTEs 830 at various levels in the nested page table hierarchy. In this fashion, the nested page walk and the page walk may be short-circuited so that one or more levels in the nested page table hierarchy of the nested page tables 644 are not traversed when addressing a data page that is mapped large within the machine memory 730. At level one in the nested page table hierarchy (the lowest level that the nested page table hierarchy supports), the stop bit 834 is ignored. In alternative embodiments, the stop bit 834 may not exist in PTEs 830 that are at level one in the nested page table hierarchy.

Each counter 836 includes two or more bits that are used to monitor the activity of the corresponding PTE. For each of the PTEs, the nested page walker 634 is configured to increment the corresponding counter 836 each time the PTE is accessed. In this fashion, the counter 836 records the number of times that its associated PTE is accessed during the nested page walks.

In alternative embodiments, the counter 836 is not included in the PTEs 830 of nested page tables 644 at every level of the nested page table hierarchy. Further, in some embodiments, the host operating system 672 saturates the counter 836 in one or more of the PTEs 830, thereby bypassing the counter incrementing step. In other embodiments, the nested page walker 634 is configured to generate an interrupt whenever the counter 836 in a PTE saturates. In some embodiments, the counters 836 are not included in any of the PTEs 830. Instead, the counters 836 are included in a completely different data structure that the nested page walker 634 maintains in parallel to the nested page tables 644. The nested page walker 634 increments the counters 836 in the parallel data structure during nested page walks. In other embodiments, the nested page walker 634 may be configured to sample the usage of the nested page tables 644 during nested page walks by only incrementing the counters 836 within the PTEs 830 of the nested page tables 644 during selected nested page walks.

Figure 9:
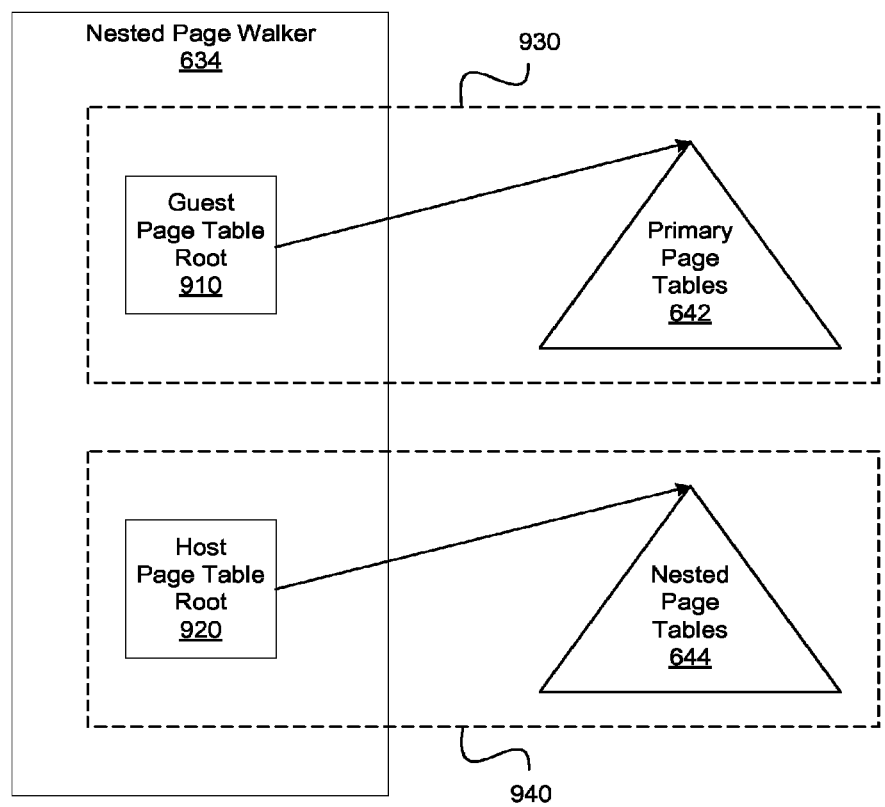
FIG. 9 is a conceptual diagram showing a nested page walk using a nested page walker, primary page tables, and nested page tables of the computer system of FIG. 6.

FIG. 9 is a conceptual diagram showing a nested page walk using a nested page walker 634, primary page tables 642, and nested page tables 644 of the computer system 600 of FIG. 6. The nested page walker 634 includes a guest page table root 910 and a host page table root 920.

The guest page table root 910 and the primary page tables 642 are in a guest domain 930 that is controlled by the guest operating system 682. Whenever the guest operating system 682 performs a context switch, the guest operating system 682 programs the guest page table root 910 to point to the appropriate set of primary page tables 642. Similarly, the host page table root 920 and the nested page tables 644 are in a VMM domain 940 that is controlled by the VMM 674. Whenever the VMM 674 runs a different VM 680, the VMM 674 programs the host page table root 920 to point to the appropriate set of nested page tables 644. In this fashion, the guest operating system 682 and the VMM 674 cooperatively set up the nested page walker 634 to perform nested page walks.

Figure 10:
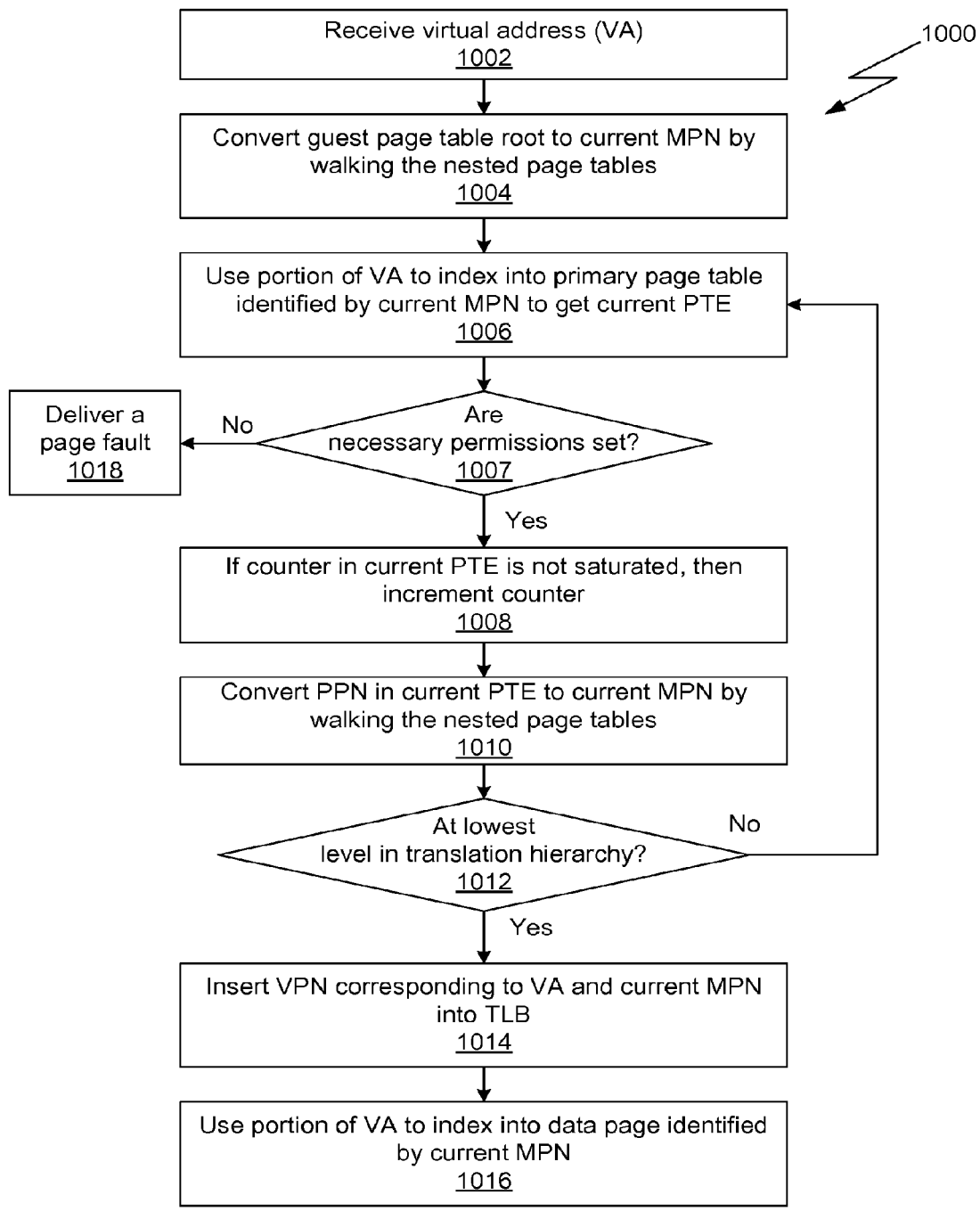
FIG. 10 is a flow diagram of method steps for mapping a virtual address to a machine address in accordance with an embodiment of the invention.

FIG. 10 is a flow diagram of method steps for mapping a virtual address to a machine address in accordance with an embodiment of the invention. Although the method steps are described in conjunction with the computer system 600 of FIG. 6, persons skilled in the art will understand that any system that performs the method steps is within the scope of the invention.

As shown, the method 1000 begins at step 1002, where the nested page walker 634 receives a virtual address. At step 1004, the nested page walker 634 converts the physical page number that is specified by the guest page table root 910 to a machine page number by performing a page walk using the nested page tables 644. The nested page walker 634 then sets a current machine page number to this machine page number. Note that a series of method steps that may be used to accomplish the conversion at step 1004 is described below in method 1100 of FIG. 11. At step 1006, the nested page walker 634 uses a portion of the virtual address to index into the primary page table 642 that is identified by the current machine page number, thereby accessing a current page table entry. At step 1007, the nested page walker 634 evaluates access properties (e.g., whether the access is for read, write, or execution purposes) in conjunction with additional bits in the current page table entry (e.g., the write permission bit and the page present bit) to determine if the requested access is permissible. If the nested page walker 634 determines that the requested access is not permissible, then the nested page walker 634 proceeds to step 1018. At step 1018, the nested page walker 634 delivers a page fault to the guest OS 682, and the method 1000 terminates.

If, at step 1007, the nested page walker 634 determines that the requested access is permissible, then the nested page walker 634 proceeds to step 1008. At step 1008, if the counter 826 in the current page table entry is not saturated, then the nested page walker 634 increments the counter 826 by one. If the counter 826 is saturated, then step 1008 is skipped. At step 1010, the nested page walker 634 converts the physical page number 822 in the current page table entry to a machine page number by performing a page walk using the nested page tables 644. The nested page walker 634 then sets the current machine page number to this machine page number. Again, a series of method steps that may be used to accomplish the conversion at step 1010 is described below in method 1100 of FIG. 11.

At step 1012, if the current page table entry is not at level one in the primary page table hierarchy and the stop bit 824 in the current page table entry is not set to one, then the method 1000 returns to step 1006. The method continues in this fashion, looping through steps 1006, 1007, 1008, 1010, and 1012, until the nested page walker 634 traverses through the primary page tables 642 to the lowest level in the primary page table hierarchy. If, at step 1012, the current page table entry is at level one in the primary page table hierarchy or the stop bit 824 in the current page table entry is set to one, then the method 1000 proceeds to step 1014. At step 1014, the nested page walker 634 inserts the virtual page number corresponding to the virtual address, received at step 1002, and the current machine page number into the TLB 632. As part of step 1014, the nested page walker 634 uses the minimum of the page sizes discovered during both the VPN-to-PPN translation and the PPN-to-MPN translation to determine the page size and the alignment for the virtual page number and the machine page number pair that the nested page walker 634 inserts into the TLB 632. At step 1016, the nested page walker 634 uses a portion of the virtual address to index into the data page that is identified by the current machine page number, and accesses the data at the machine address corresponding to the virtual address received at step 1002.

Figure 11:
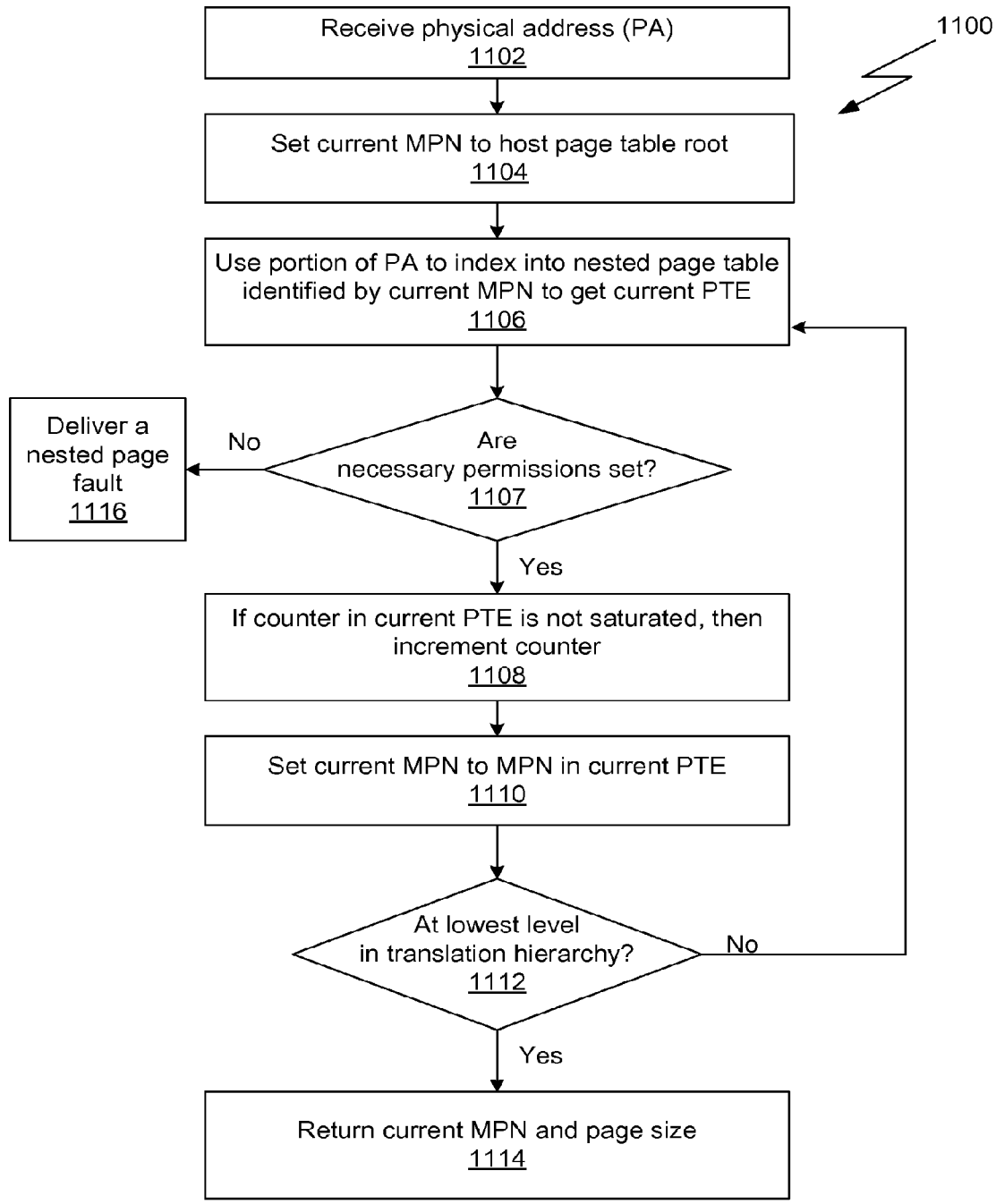
FIG. 11 is a flow diagram of method steps for mapping a physical address of a virtualized memory resource to a machine address in accordance with an embodiment of the invention.

FIG. 11 is a flow diagram of method steps for mapping a physical address of a virtualized memory resource to a machine address in accordance with an embodiment of the invention. Although the method steps are described in conjunction with the computer system 600 of FIG. 6, persons skilled in the art will understand that any system that performs the method steps is within the scope of the invention.

As shown, the method 1100 begins at step 1102, where the nested page walker 634 receives a physical address. At step 1104, the nested page walker 634 sets the current machine page number to the host page table root 920. At step 1106, the nested page walker 634 uses a portion of the physical address to index into the nested page table 644 that is identified by the current machine page number, thereby accessing a current page table entry. At step 1107, the nested page walker 634 evaluates access properties (e.g., whether the access is for read, write, or execution purposes) in conjunction with additional bits in the current page table entry (e.g., the write permission bit and the page present bit) to determine if the requested access is permissible. If the nested page walker 634 determines that the requested access is not permissible, then the nested page walker 634 proceeds to step 1116. At step 1116, the nested page walker 634 delivers a nested page fault to the VMM 674, and the method 1100 terminates. If, at step 1107, the nested page walker 634 determines that the requested access is permissible, then the nested page walker 634 proceeds to step 1108. At step 1108, if the counter 836 in the current page table entry is not saturated, then the nested page walker 634 increments the counter 836 by one. If the counter 836 is saturated, then step 1108 is skipped. At step 1110, the nested page walker 634 sets the current machine page number to the machine page number 832 in the current page table entry.

At step 1112, if the current page table entry is not at level one in the nested page table hierarchy and the stop bit 834 in the current page table entry is not set to one, then the method 1100 returns to step 1106. The method continues in this fashion, looping through steps 1106, 1107, 1108, 1110, and 1112, until the nested page walker 634 traverses through the nested page tables 644 to the lowest level in the nested page table hierarchy. If, at step 1112, the current page table entry is at level one in the nested page table hierarchy or the stop bit 834 in the current page table entry is set to one, then the method 1100 proceeds to step 1114. At step 1114, the nested page walker 634 returns the current machine page number and the associated page size corresponding to the physical address received at step 1102. The access to the PTE or data at the translated address is then performed by a step in a higher level nested page walker 634 routine, such as step 1006 or step 1016 of the method 1000.

Using the counters 826 in the PTEs 820 as described in the method 1000 and the counters 836 in the PTEs 830 as described in the method 1100, the nested page walker 634 tracks the activity throughout both the primary page tables 642 and the nested page tables 644 during the nested page walks that are initiated after TLB 632 misses.

In one embodiment, the guest operating system 682 uses the information in the counters 826 to define a policy for deploying large data pages in the physical memory 720 using any technically feasible method. Similarly, the VMM 674 uses the information in the counters 836 to define a policy for deploying large data pages in the machine memory 730 using any technically feasible method.

Further, the VMM 674 may read information in the PTEs 820 in addition to the information in the counters 836 to define a hybrid policy for deploying large data pages. For example, each entry in the TLB 632 includes both a VPN and an MPN. A particular entry in the TLB 632 defines a large page mapping only when both the VPN and the MPN are mapped large. One hybrid policy that the VMM 674 may implement is to deploy large pages in machine memory 730 wherever there is a corresponding large page in physical memory 720, and to deploy additional large pages in machine memory 730 based on the values in the counter 836.

In alternative embodiments, the nested page walker 634 may be configured to increment only the counters 826 within the PTEs 820 of the primary page tables 642 or to increment only the counters 836 within the PTEs 830 of the nested page tables 644.

In the embodiments of the invention described above, the page walker 134 and the nested page walker 634 are implemented as a hardware page walker within the MMU 130 and MMU 630, respectively. This hardware page walker includes an incrementing unit that reads a current count from a multi-bit counter of a page table entry, increments the current count, and writes the incremented counter back to the multi-bit counter. The hardware page walker also includes an increment enable bit. When this bit is set, e.g., set to 1, the hardware page walker increments the multi-bit counter of a page table entry when it visits the page table entry. When this bit is not set, e.g., set to 0, the hardware page walker does not increment the multi-bit counter of a page table entry when it visits the page table entry. The incrementing unit of the hardware page walker may be implemented within the MMU in any manner known to those skilled in the art, including as a customized piece of integrated circuitry or using general purpose architectural registers, load/store units, special-purpose register processing units, and/or fixed-point units that already exist in the MMU.

While the foregoing is directed to embodiments of the present invention, other and further embodiments of the invention may be devised without departing from the basic scope thereof, and the scope thereof is determined by the claims.

What is claimed is:

1. A memory management unit of a computer system that employs page tables to map virtual memory pages to physical memory pages, comprising:
    a translation lookaside buffer (TLB) for storing a number of mappings of virtual memory pages to physical memory pages; and
    a hardware page walker for accessing entries of the page tables when a mapping of a particular virtual memory page to a particular physical memory page is not stored in the TLB, and incrementing during a page table walk multi-bit counters that are associated with entries of the page tables in response to accessing of the respective entries of the page tables by the hardware page walker so as to track access frequencies of different entries of the page tables using the multi-bit counters.

2. The memory management unit according to claim 1, wherein the page tables are arranged in a hierarchical manner, and the hardware page walker accesses page table entries at successive lower levels in the page table hierarchy until a stop bit is encountered.

3. The memory management unit according to claim 2, wherein, for each page table entry that is accessed by the hardware page walker, the hardware page walker increments a multi-bit counter associated with said page table entry unless said multi-bit counter has saturated.

4. The memory management unit according to claim 2, wherein the hardware page walker has an increment enable bit and if the increment enable bit is set, the hardware page walker increments a multi-bit counter associated with a page table entry when said page table entry is accessed and if the increment enable bit is not set, the hardware page walker does not increment a multi-bit counter associated with a page table entry when said page table entry is accessed.

5. The memory management unit according to claim 2, wherein the hardware page walker inserts a mapping of the particular virtual memory page to the particular physical memory page in the TLB.

6. In a virtual memory system having page tables, a method for mapping a virtual memory address to a physical memory address, comprising:
    accessing a page table entry of a page table during a page table walk using a first pointer to a physical memory location and a first portion of the virtual memory address;
    incrementing, during the page table walk, a multi-bit counter associated with said page table entry in response to said accessing so as to track an access frequency of said page table entry using the multi-bit counter; and
    allocating a large page when the multi-bit counter reaches a predetermined threshold.

7. The method according to claim 6, wherein said page table entry includes the multi-bit counter.

8. The method according to claim 6, wherein the page tables are arranged in a hierarchical manner and said page table entry further includes a stop bit that indicates whether the page table entry is pointing to an address of another page table in the page table hierarchy.

9. The method according to claim 8, wherein the predetermined threshold differs depending on where the page table entry resides in the page table hierarchy.

10. The method according to claim 6, wherein said page table entry is not at the lowest level of the page table hierarchy and:
    the large page is allocated in physical memory;
    data from a collection of small pages previously accessed through lower level page table entries associated with said page table entry is copied to the large page in the physical memory;
    a stop bit of said page table entry is set to 1; and
    a page number of the large page in physical memory is stored as a pointer in said page table entry.

11. The method according to claim 6, wherein an interrupt is generated when the multi-bit counter saturates.

12. The method according to claim 6, wherein each of a plurality of page table entries includes a multi-bit counter which increments when the page table entry associated therewith is accessed.

13. The method according to claim 12, further comprising:
    generating an interrupt each time a multi-bit counter saturates; and
    allocating large pages based on the interrupts.

14. The method according to claim 12, wherein the multi-bit counter associated with a page table entry, even prior to its saturation, does not increment each and every time said page table entry is accessed.

15. The method according to claim 6, further comprising:
storing a virtual memory page number that includes at least the first portion of the virtual memory address in a first location of a translation lookaside buffer (TLB); and
storing a physical memory page number that includes at least the first portion of the accessed physical memory address in a second location of the TLB that is associated with the first location, wherein the virtual memory system employs a default page size and the stored virtual memory page number and the stored physical memory page number correspond to a page size that is greater than the default page size.

16. In a virtual memory system of a virtual machine having nested page tables and primary page tables, wherein the nested page tables have multiple page table entries, each of which includes a pointer to a host physical memory location, and the primary page tables have multiple page table entries, each of which includes a pointer to a virtualized physical memory location, a method for mapping a virtual memory address to a host physical memory address, comprising:
retrieving a virtualized physical memory address from a page table entry of one of the primary page tables using a portion of the virtual memory address;
accessing a page table entry of a nested page table during a page table walk using a first pointer to a host physical memory location and a first portion of the virtualized physical memory address;
incrementing, during the page table walk, a multi-bit counter associated with the page table entry of said nested page table in response to said accessing so as to track an access frequency of said page table entry using the multi-bit counter; and
allocating a large page when the multi-bit counter reaches a predetermined threshold.

17. The method according to claim 16, wherein an interrupt is generated when the multi-bit counter saturates.

18. The method according to claim 17, wherein the multi-bit counter associated with the page table entry of said nested page table, even prior to its saturation, does not increment each and every time the page table entry of said nested page table is accessed.

19. The method according to claim 18, further comprising:
storing a virtual memory page number that includes a portion of the virtual memory address in a first location of a translation lookaside buffer (TLB); and
storing a host physical memory page number that includes a portion of the accessed host physical memory address in a second location of the TLB that is associated with the first location,
wherein the virtual memory system employs a default page size and the stored virtual memory page number and the stored physical memory page number correspond to a page size that is greater than the default page size.

20. The method according to claim 16, wherein the page table entry of said nested page table includes the multi-bit counter.

21. The method according to claim 20, wherein the nested page tables are arranged in a hierarchical manner and page table entries of the nested page tables further include a stop bit that indicates whether the corresponding page table entry is pointing to an address of another nested page table in the nested page table hierarchy.

22. The method according to claim 21, wherein said nested page table entry is not at the lowest level of the nested page table hierarchy and:
the large page is allocated in the host physical memory;
data from a collection of small pages previously accessed through lower level nested page table entries associated with said nested page table entry is copied to the large page in the host physical memory;
a stop bit of said nested page table entry is set to 1; and
a page number of the large page in the host physical memory is stored as a pointer in said nested page table entry.

23. The method according to claim 16, wherein page table entries of the primary page tables include a multi-bit counter that is incremented when the corresponding page table entry is accessed.

24. The method according to claim 23, wherein the primary page tables are arranged in a hierarchical manner and page table entries of the primary page tables further include a stop bit that indicates whether the corresponding page table entry is pointing to an address of another primary page table in the primary page table hierarchy.

25. The method according to claim 24, wherein if the multi-bit counter associated with said primary page table entry that is not at the lowest level of the primary page table hierarchy reaches a predetermined threshold:
a large page is allocated in the virtualized physical memory;
data from a collection of small pages previously accessed, through lower level primary page table entries associated with said primary page table entry is copied to the large page in the virtualized physical memory;
a stop bit of said primary page table entry is set to 1; and
a page number of the large page in the virtualized physical memory is stored as a pointer in said primary page table entry.

26. The method according to claim 23, wherein an interrupt is generated when a multi-bit counter associated with a page table entry of a primary page table saturates.

27. The method according to claim 26, wherein the multi-bit counter associated with said primary page table entry, even prior to its saturation, does not increment each and every time said primary page table entry is accessed.

* * * * *